United States Patent [19]

Hirshberg

[11] Patent Number: 4,941,263
[45] Date of Patent: Jul. 17, 1990

[54] SYSTEM FOR AIDING A DRIVER'S DEPTH PERCEPTION

[75] Inventor: Gerald P. Hirshberg, Del Mar, Calif.

[73] Assignee: Nissan Design International, Inc., San Diego, Calif.

[21] Appl. No.: 912,532

[22] Filed: Sep. 29, 1986

Related U.S. Application Data

[63] Continuation of Ser. No. 715,343, Mar. 25, 1985, abandoned.

[51] Int. Cl.⁵ .................................. G01B 11/14
[52] U.S. Cl. ............................ 33/264; 33/286;
    340/435; 350/174; 116/28 R; 353/11
[58] Field of Search ............ 33/264, 286, 288, 125 A;
    353/11-14; 356/3, 20, 21; 350/174, 604, 605,
    606; 340/97, 98, 103, 104, 51; 116/28 R, 202

[56] References Cited

U.S. PATENT DOCUMENTS

| | | | |
|---|---|---|---|
| 1,871,877 | 8/1932 | Buckman | 350/174 |
| 1,879,592 | 9/1932 | Thomas | 356/21 |
| 3,339,203 | 8/1967 | Curry, Jr. et al. | 350/174 |
| 3,469,234 | 9/1969 | Greacen | 340/103 |
| 3,521,234 | 7/1970 | Davin | 340/104 |
| 3,603,929 | 9/1971 | Drysdale | 350/174 |
| 3,670,423 | 6/1972 | Leber | 33/286 |
| 3,715,721 | 2/1973 | Irving et al. | 340/62 |
| 3,762,802 | 10/1973 | Allen | 350/604 |
| 3,772,795 | 11/1973 | Calvet | 33/264 |
| 3,848,974 | 11/1974 | Hosking et al. | 350/174 |
| 3,859,732 | 1/1975 | Davin | 33/264 |
| 3,887,273 | 6/1975 | Griffiths | 353/14 |
| 4,257,706 | 3/1981 | Smith | 356/3 |
| 4,417,404 | 11/1983 | Doberschutz | 33/277 |

FOREIGN PATENT DOCUMENTS 2633067 2/1978 Fed. Rep. of Germany ...... 340/104

Primary Examiner—William A. Cuchlinski, Jr.
Assistant Examiner—Patrick R. Scanlon
Attorney, Agent, or Firm—Baker, Maxham, Jester & Meador

[57] ABSTRACT

An optical system for aiding the driver of a vehicle in judging the proximity of the forward end of the vehicle to an object directly in front of the vehicle, particularly when parking close to a wall or barricade or when pulling up close to another vehicle stopped at an intersection. An illuminated target and a mirror mounted beneath opposite sides of the dashboard are used to reflect an image of the target off the interior surface of the windshield at a location so that the reflected image is in the normal field of view of the driver. A virtual image of the target is perceived by the driver to emanate from a position above the forward end of the vehicle. The driver may gradually advance the vehicle until the virtual image appears to the driver to be juxtaposed with the object at which time there will be a predetermined minimum safe distance between the forward end of the vehicle and the target.

2 Claims, 2 Drawing Sheets

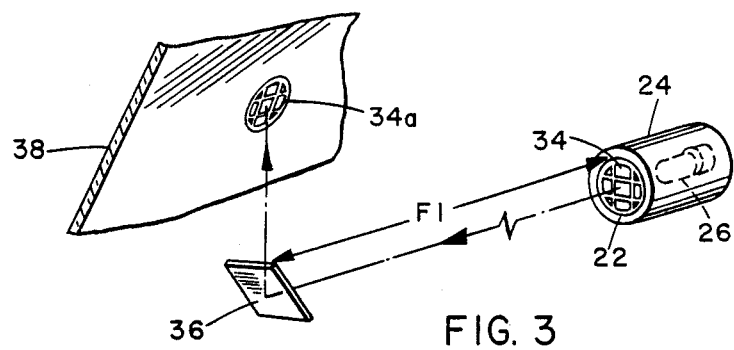
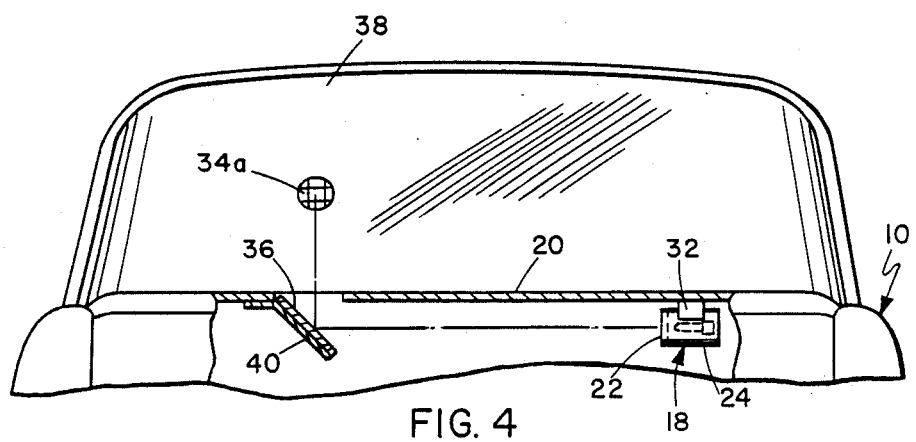
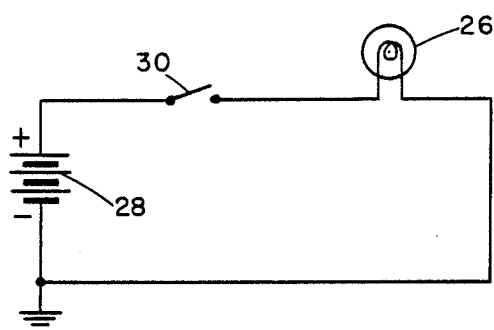

SYSTEM FOR AIDING A DRIVER'S DEPTH PERCEPTION

This is a Rule 62 continuation of my prior U.S. patent application Ser. No. 715,343, filed Mar. 25, 1985, and now abandoned.

BACKGROUND OF THE INVENTION

The present invention relates to devices for aiding in the navigation of a vehicle, and more particularly, to an optical system for an automobile which aids the driver in judging the proximity of the forward end of the automobile to an object directly in front of the automobile when parking close to a wall or when pulling up close behind another automobile stopped at an intersection.

For many years automobiles have had long horizontally extending hoods. A person driving such an automobile could easily judge the depth of the forward end of the automobile, even if he or she couldn't see the front bumper, by focusing on the front end of the hood. The continual effort to increase automobile milage has resulted in automobiles now in widespread use that have steeply sloped or wedge-shaped forward ends to minimize aerodynamic resistance. The forward end of such an automobile, typically the leading edge of its front bumper, is not visible to the driver from his or her normal seated position in the driver's seat. Since this type of automobile has a front hood which "falls off" or descends rather dramatically from the windshield it is extremely difficult for the driver to judge the distance between the forward end of the automobile and an object immediately in front of the automobile. This makes it difficult to park close to a wall or barricade in front of the automobile without bumping it. It also makes it difficult to pull up close to another automobile stopped at an intersection.

A number of optical systems have been developed in the past for aiding a driver in reading the instrumentation of an automobile without having to look down, for judging the distance to a preceding automobile when traveling down the highway, or for aiding in backing up a motor vehicle. However, none of these systems is adapted to aid a driver in positioning the forward end of his or her car close to another object.

U.S. Pat. No. 1,871,877 of Buckman, U.S. Pat. No. 3,848,974 of Hosking et al., and U.S. Pat. No. 3,887,273 of Griffiths disclose different approaches for "heads up" speedometer display. An image of the speedometer is projected onto the interior surface of the windshield so that the driver need not look away from the road to check the speed of the automobile.

U.S. Pat. No. 1,879,592 of Thomas, U.S. Pat. No. 3,521,234 of Davin, U.S. Pat. No. 3,670,423 of Leber, U.S. Pat. No. 3,772,795 of Calvet, U.S. Pat. No. 3,859,732 of Davin, and U.S. Pat. No. 4,417,404 of Doberschutz disclose various scales which are affixed on the windshield, rear window or rear view mirror and used by a driver to determine the distance between his or her car and objects ahead or behind his or her car.

U.S. Pat. No. 4,257,706 of Smith discloses a pair of rods or sights at spaced locations on the side of a truck which are aligned with a ground line of a wall by the driver looking in a rear view mirror to position the rear end of the truck closely adjacent to the wall.

U.S. Pat. No. 3,715,721 of Irving et al. discloses another system for allowing a driver to judge a safe following distance from a preceding vehicle. An illuminated drum driven by the vehicle gear box projects images of index lines onto a reflective surface beneath the windshield. To the driver these images are seen at infinity and they move together in a manner proportional to an increase in the vehicle's speed to warn the driver that he or she must increase the distance of separation between his or her car and any vehicle that is being followed.

Finally, U.S. Pat. No. 3,762,802 of Allen discloses a rotatable mirror mounted to the front end of an automobile for enabling the driver to view otherwise blind areas, particularly in parking or in driving out of blind driveways.

SUMMARY OF THE INVENTION

It is therefore the primary object of the present invention to provide a system for aiding the driver of an automobile in judging the distance between the front end of his or her automobile and an object directly in front of the automobile.

It is another object to provide such a system which can be readily observed in the normal field of view of the driver.

It is another object of the present invention to provide such a system which has relatively few parts, is inexpensive to install, and is not subject to malfunctions or breakdowns.

It is still another object of the present invention to provide such a system which can be readily adapted to many different types of automobiles.

According to the preferred embodiment of my invention an image of a target or other locating symbol is projected onto the reflectant interior surface of the front windshield of an automobile. A virtual image of the target is created which is perceived by the driver to be spaced approximately over the leading edge of the front bumper of the automobile. When parking close to an obstacle in front of the automobile the driver may pull up gradually until the virtual image of the target is juxtaposed with or appears very close to the obstacle. The projected virtual image is useful in almost all automobiles since the leading edge of the front bumper is generally not visible to the driver. The projected virtual image is particularly useful in new automobiles having wedge-shaped front ends in which the front hood slopes to such a degree that it is not visible to the driver and the driver therefore has very little, if any, depth perception regarding the relative length of the vehicle that he or she is driving.

The target may be a single grid pattern, a pair of cross-hairs marking the front corners of the vehicle or some other locating symbols. The target may be mounted below the dashboard on the passenger side of the vehicle and illuminated from behind by a lamp. A mirror mounted beneath the dashboard on the driver side of the vehicle receives an image of the target projected horizontally across the vehicle underneath the dashboard. The mirror reflects the image of the target upwardly off the interior surface of the front windshield and then toward the driver in his or her normal field of view. Through an optical illusion the driver sees an image of the target which appears to emanate from a location several feet in front of the driver. This image seems to be positioned above the approximate location of the leading edge of the front bumper. Thus my invention utilizes the reflectivity of the interior surface of the front windshield in transmitting an image of a target so as to aid in the driver's exterior depth perception.

BRIEF DESCRIPTION OF THE DRAWINGS

FIG. 3 is an enlarged view of the illuminated target and mirror and the manner in which an image of the target is reflected off the interior surface of the front windshield of the automobile.

FIG. 4 is a rear elevation view of the front windshield and dashboard of the automobile of FIG. 1 with portions of the dashboard broken away to illustrate the manner in which the image of the illuminated target is transmitted along a focal path which extends across the automobile and beneath the dashboard.

FIG. 5 is a schematic diagram of the electrical circuit of the preferred embodiment of my invention.

DESCRIPTION OF THE PREFERRED EMBODIMENT

Figure 1:
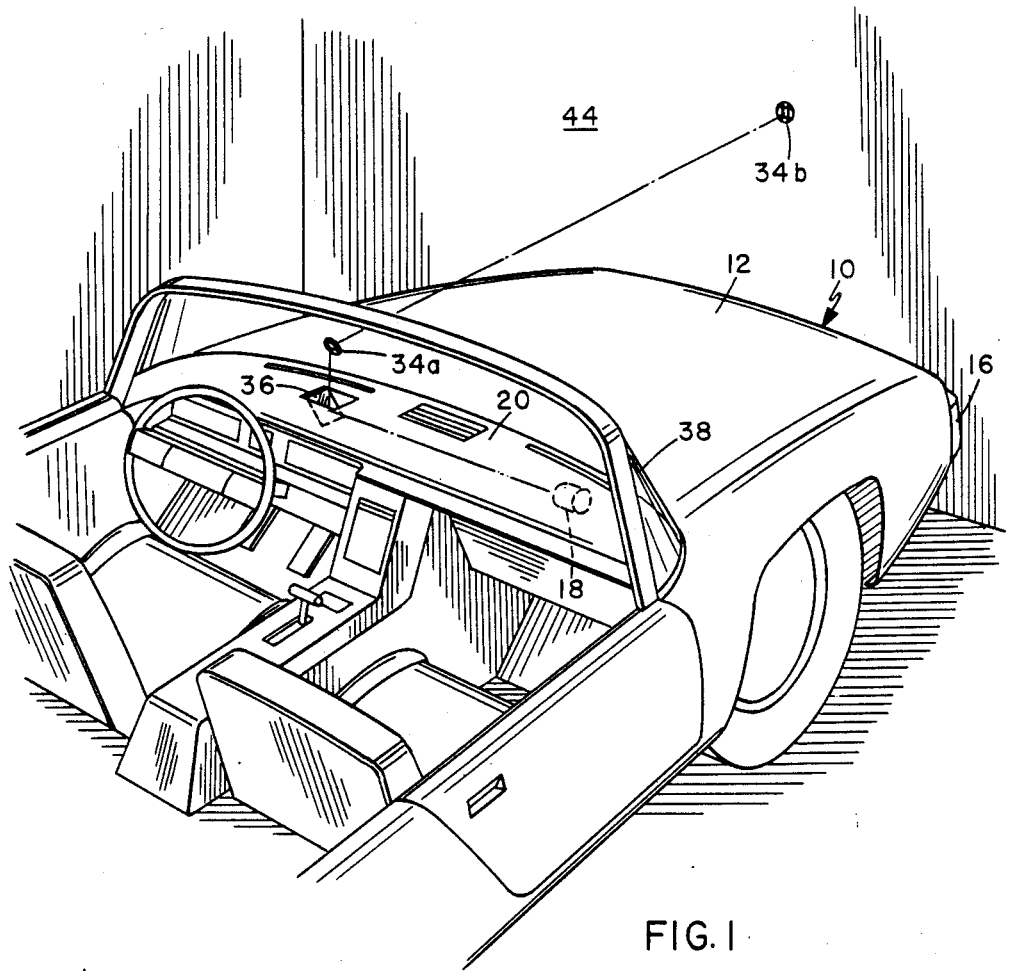
FIG. 1 is a perspective view of the passenger compartment and front end of an automobile equipped with a preferred embodiment of my invention and illustrating the manner in which the virtual image of the target is created.
Figure 2:
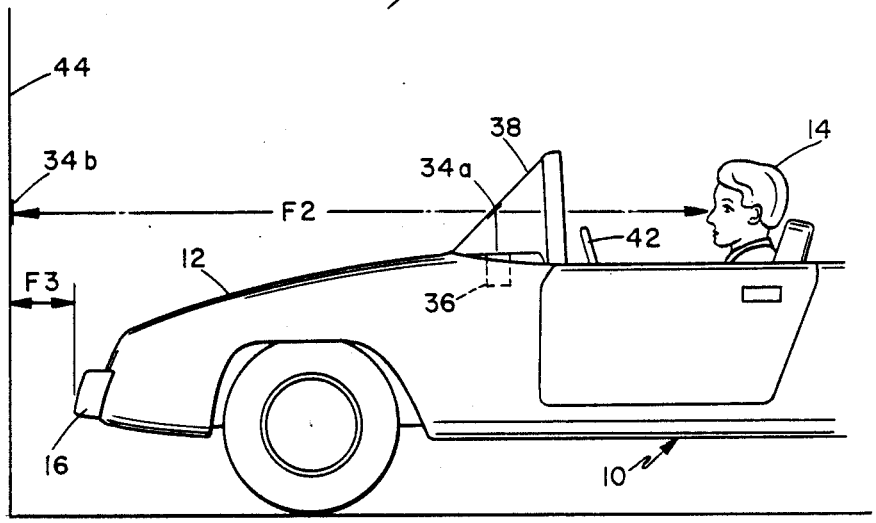
FIG. 2 is a slightly reduced side elevation view of the automobile of FIG. 1 and illustrating the dimensional relationships between the location of the virtual image and the forward end of the automobile.

Referring to FIG. 2, a vehicle in the form of an automobile 10 has an inclined front hood 12 so that the driver 14 cannot see the leading edge of the front bumper 16. An illuminated target assembly 18 (FIGS. 1,3 and 4) is mounted beneath the dashboard 20 of the automobile on the passenger side thereof. As best illustrated in FIGS. 3 and 4, the target assembly 18 may comprise a reticile or target disk 22 mounted over one end of a cylindrical housing 24. An incandescent lamp 26 is mounted within the housing 24 for illuminating the target disk 22 from behind when energized from battery 28 (FIG. 5) via switch 30. The cylindrical housing 24 is mounted to the underside of the dashboard by a bracket 32 (FIG. 4). The target disk is black and not transparent except for a target 34 in the form of a semi-transparent grid pattern formed therein. This target or grid pattern 34 is made of a translucent material such as plastic having a vivid color such as orange so that the projected image of the target will be readily discernible to the driver.

Referring to FIGS. 1, 3 and 4, an image 34a of the target is transmitted horizontally beneath the dashboard 20 across a distance F1 to a mirror 36 mounted beneath the dashboard on the driver side of the automobile. The mirror 36 reflects the light received from the illuminated target assembly 18 vertically up onto the interior surface of the front windshield 38 of the automobile at a location so that the reflected image is in the forward field of view of the driver 14. The mirror 36 is supported at an angle of approximately forty-five degrees relative to the horizontal by an arm 40 (FIG. 4) which extends downwardly from the underside of the dashboard 20. The mirror 36 is thus positioned forward of the steering wheel 42.

Referring to FIGS. 1 and 2, the windshield 38 reflects the light from the illuminated target assembly back to the driver's eyes. Because of the optics involved, the driver perceives a virtual image 34b of the target which appears to emanate from a position above the forward end of the automobile. This image is spaced a distance F2 (FIG. 2) from the driver's eyes. The distance F1 between the illuminated target assembly 18 and the mirror 36 is approximately the same as the distance F2 between the virtual image 34b of the target and the driver's eyes.

When the driver 14 pulls the automobile 10 up next to an obstacle such as a wall 44 (FIG. 2), the driver keeps gradually pulling forward until the virtual image 34b of the target appears to be juxtaposed directly on top of and in the same plane as the surface of the wall. The front bumper 16 will then be spaced a predetermined minimum safe distance F3 from the wall. The focal lengths are established so that the distance F2 places the virtual image 34b about six to eight inches in front of the leading edge of the front bumper 16. If the distance F2 were made equal to the horizontal distance between the driver's eyes and the leading edge of the bumper 16, then the automobile would hit the wall 44 when he registered the virtual image 34b with the surface of the wall. In actual practice, the distance F1 is made slightly less than the distance F2 (FIG. 3) to compensate for the magnification produced by the concave shape of the windshield 38 in the lateral reflectance path.

The illuminated target assembly 18 may be energized all of the time or it may be controlled via a manual switch 30 (FIG. 5) mounted on the dashboard. This enables the driver to selectively enable and disable the depth perception feature. Alternatively, the illuminated target assembly may be automatically energized when the brakes of the automobile are applied or when the speed of the automobile drops below a predetermined threshold parking speed.

Having described a preferred embodiment of my invention it will be apparent to those skilled in the art that my invention may be modified in both arrangement and detail. The focal path F1 (FIG. 3) may extend along other orientations such as from the left side of the dashboard to one of the window posts of the automobile. The mirror 36 could be curved and/or lenses could be used in focusing the image 34a of the target on the windshield in order to correct aberrations caused by the curvature of the windshield and ensure that the virtual image 34b of the target appears sharply focused and not blurry to the driver. A potentiometer or similar device could be added to the circuit of FIG. 5 to allow the brightness of the lamp 26 to be varied to adjust the depth perception system to different levels of ambient light outside the automobile and inside the passenger compartment. The system could be installed under the rear deck and the image reflected off the interior surface of the rear window. In this manner a virtual image of the target could be created which appears to emanate above the rear end of the automobile. Such a rear virtual image could then be used to improve rear depth perception when attempting to back up close to an obstacle, such as occurs in parallel parking. In view of the foregoing modifications and adaptations, the protection afforded by invention should only be limited in accordance with the scope of the following claims.

I claim:

1. A system for aiding a driver of a vehicle in positioning the vehicle so that its front bumper will be closely adjacent to a wall or other stationary object in front of the vehicle, comprising:
   a transparent windshield having a predetermined curvature mounted in the vehicle to permit a forward field of view of a driver seated in an interior of the vehicle on a driver's side thereof;
   a dashboard extending across a width of the interior of the vehicle adjacent the windshield, the dashboard having an upwardly facing opening on the driver's side of the interior which communicates with an unobstructed focal path which extends beneath the dashboard from the driver's side of the interior to a passenger side of the interior;

means mounted beneath the dashboard on the passenger side of the interior at a first end of the focal path for generating an illuminated colored target of fixed dimensions, including a fixed reticile, a lamp mounted behind the reticile, and a source of electric power connectable to the lamp;

a fixed mirror mounted beneath the dashboard on the driver's side of the interior at a second end of the focal path a fixed distance F1 from the means for generating the target for reflecting light therefrom upwardly through the opening in the dashboard onto an interior surface of the windshield to thereby create a readily discernible virtual image of the colored target which appears to the driver to emanate from a location a fixed distance F2 from the driver's eyes, the location of the virtual image being above and slightly forward of the front bumper; and the distance F1 between the means for generating the target and the mirror being selected relative to the distance F2 between the virtual image of the colored target and the driver's eyes to compensate for the curvature of the windshield and so that the driver may gradually advance the vehicle until the virtual image of the colored target appears to be juxtaposed with the object at which time a fixed distance F3 between the object and the front bumper will be approximately eight inches or less.

2. A method of positioning the forward end of a vehicle with an inclined front hood closely adjacent to a wall or other stationary object in front of the vehicle, comprising the steps of:

sitting in the driver's seat of the vehicle;

generating a readily discernible virtual image of a vividly colored target which appears to emanate from a fixed location above and slightly ahead of the forward end of the vehicle; and gradually advancing the vehicle until the virtual image of the target appears to be juxtaposed with the object at which time the forward end of the vehicle will be closely adjacent the object.

* * * * *